(12) United States Patent
Son et al.

(10) Patent No.: US 10,446,856 B2
(45) Date of Patent: Oct. 15, 2019

(54) SOLID OXIDE FUEL CELL HAVING LONGITUDINAL AND LATERAL CHANNELS

(71) Applicant: Posco Energy Co., Ltd., Seoul (KR)

(72) Inventors: Hyeon Min Son, Gyeongsangbuk-do (KR); Sang-Cheol Lee, Gyeongsangbuk-do (KR); Byung Geun Kuk, Gyeongsangbuk-do (KR); Sang Gyun Park, Gyeongsangbuk-do (KR); Sang Hyun Park, Seoul (KR)

(73) Assignee: Posco Energy Co., Ltd. (KR)

( * ) Notice: Subject to any disclaimer, the term of this patent is extended or adjusted under 35 U.S.C. 154(b) by 296 days.

(21) Appl. No.: 14/442,222

(22) PCT Filed: Jul. 8, 2013

(86) PCT No.: PCT/KR2013/006049
§ 371 (c)(1),
(2) Date: May 12, 2015

(87) PCT Pub. No.: WO2014/098335
PCT Pub. Date: Jun. 26, 2014

(65) Prior Publication Data
US 2016/0028094 A1    Jan. 28, 2016

(30) Foreign Application Priority Data

Dec. 18, 2012  (KR) .......................... 10-2012-0148194

(51) Int. Cl.
*H01M 8/0258* (2016.01)
*H01M 8/026* (2016.01)
(Continued)

(52) U.S. Cl.
CPC ......... *H01M 8/026* (2013.01); *H01M 8/0265* (2013.01); *H01M 8/04089* (2013.01);
(Continued)

(58) Field of Classification Search
CPC ............. H01M 8/0258; H01M 8/0265; H01M 2300/0071; H01M 8/04089;
(Continued)

(56) References Cited

U.S. PATENT DOCUMENTS 6,296,963 B1 * 10/2001 Nanjo ................. H01M 8/2425
429/456
2001/0008719 A1 * 7/2001 Ikeda ..................... B21D 13/04
72/196
(Continued)

FOREIGN PATENT DOCUMENTS

CA    2824623 A1 *  7/2012  .......... H01M 8/0247
EP    1447869 A1    8/2004
(Continued)

OTHER PUBLICATIONS

English translation of Okada (JPH 1092447 A).*
(Continued)

*Primary Examiner* — Jonathan G Leong
*Assistant Examiner* — Aaron J Salter
(74) *Attorney, Agent, or Firm* — Lerner, David, Littenberg, Krumholz & Mentlik, LLP

(57) ABSTRACT

Provided is a solid oxide fuel cell having longitudinal and lateral channels in an electronic separator plate. A solid oxide fuel cell includes a unit cell formed by stacking a cathode, electrolyte, and an anode, a separator plate having channels in both surfaces thereof, wherein reaction gas flows through the channels, and the channels include longitudinal channels parallel to a flow direction of the reaction gas, and lateral channels crossing the flow direction of the reaction gas, and a collector disposed between the unit cell and the separator plate. The longitudinal channels increase in width from a reaction gas inflow hole to a reaction gas outflow hole.

7 Claims, 5 Drawing Sheets

(51) Int. Cl.
  *H01M 8/2457*   (2016.01)
  *H01M 8/2432*   (2016.01)
  *H01M 8/12*     (2016.01)
  *H01M 8/04089*  (2016.01)
  *H01M 8/0265*   (2016.01)
  *H01M 8/1004*   (2016.01)
  *H01M 8/124*    (2016.01)

(52) U.S. Cl.
  CPC ........... *H01M 8/1004* (2013.01); *H01M 8/12* (2013.01); *H01M 8/2432* (2016.02); *H01M 8/2457* (2016.02); *H01M 2008/1293* (2013.01); *H01M 2300/0071* (2013.01)

(58) Field of Classification Search
  CPC .............. H01M 8/1004; H01M 8/12; H01M 2008/1293; Y02E 60/521; Y02E 60/525
  See application file for complete search history.

(56) References Cited

U.S. PATENT DOCUMENTS

| | | | | |
|---|---|---|---|---|
| 2002/0168562 | A1* | 11/2002 | Funatsu | B21C 37/02 429/518 |
| 2003/0232234 | A1* | 12/2003 | Cisar | H01M 8/0206 429/437 |
| 2004/0058219 | A1 | 3/2004 | Abdou et al. | |
| 2004/0091766 | A1 | 5/2004 | Yoo et al. | |
| 2004/0253504 | A1* | 12/2004 | Mossman | H01M 4/861 429/434 |
| 2006/0046118 | A1 | 3/2006 | Suh et al. | |
| 2008/0032172 | A1* | 2/2008 | Mukerjee | H01M 8/0204 429/465 |
| 2008/0280177 | A1* | 11/2008 | Ose | H01M 8/0247 429/420 |
| 2009/0214900 | A1 | 8/2009 | Hoffjann et al. | |
| 2010/0326914 | A1* | 12/2010 | Drost | B01D 63/082 210/644 |
| 2011/0159396 | A1 | 6/2011 | Kleemann et al. | |
| 2013/0288151 | A1* | 10/2013 | Yoshizawa | H01M 8/0247 429/480 |

FOREIGN PATENT DOCUMENTS

| | | | |
|---|---|---|---|
| EP | 1732154 | A1 | 12/2006 |
| JP | 11297341 | A * | 10/1999 |
| JP | H11-297341 | A | 10/1999 |
| JP | 2008-053032 | A | 3/2008 |
| JP | 2008-198393 | A | 8/2008 |
| JP | 2009-514151 | A | 4/2009 |
| JP | 2011210568 | A | 10/2011 |
| JP | 2011528159 | A | 11/2011 |
| KR | 20040031697 | A | 4/2004 |
| KR | 20040038751 | A | 5/2004 |
| KR | 20060020015 | A | 3/2006 |
| KR | 20060021376 | A | 3/2006 |
| KR | 100665391 | B1 | 1/2007 |
| KR | 20070037207 | A | 4/2007 |

OTHER PUBLICATIONS

English human translation of Towata (JP 11297341 A) (Year: 1999).*
Extended Search Report from European Application No. 13866257.2, dated Oct. 20, 2015.
International Search Report for Application No. PCT/KR2013/006049.

* cited by examiner

SOLID OXIDE FUEL CELL HAVING LONGITUDINAL AND LATERAL CHANNELS

CROSS-REFERENCE TO RELATED APPLICATION

This application is a national phase entry under 35 U.S.C. § 371 of International Application No. PCT/KR2013/006049, filed Jul. 8, 2013, which claims priority to Korean Patent Application No. 10-2012-0148194, filed Dec. 18, 2012, the disclosures of which are incorporated herein by reference.

TECHNICAL FIELD

The present invention relates to a solid oxide fuel cell having longitudinal and lateral channels, and more particularly, to a solid oxide fuel cell having longitudinal and lateral channels in a separator plate constituting the solid oxide fuel cell.

BACKGROUND

Fuel cells are energy conversion devices using an electrochemical reaction of a fuel with an oxidizing agent and convert chemical energy of the fuel into electric energy without converting the chemical energy into thermo-mechanical energy. Thus, generating efficiency of fuel cells is higher than that of conventional generating systems, and fuel cells are eco-friendly and are actively researched as a future power source.

Fuel cells may be classified into phosphoric acid fuel cells (PAFCs), polymer electrolyte membrane fuel cells (PEMFCs), molten carbonate fuel cells (MCFCs), direct methanol fuel cells (DMFCs), and solid oxide fuel cells (SOFCs) according to electrolyte and fuels used therein. Fuel cells have different operation temperatures, and materials for the fuel cells depend on the operation temperatures. PEMFCs have an operation temperature of about 80° C. PAFCs have an operation temperature of about 200° C. MCFCs have an operation temperature of about 650° C. SOFCs have an operation temperature of about 800° C.

Of these, SOFCs which are formed of only solid materials such as a ceramic or a metal have the highest energy efficiency, provide a wide choice of the solid materials, and are adapted for recycling waste heat.

For example, Japanese Patent Publication No. 2011-210568 discloses a fuel electrode collector unit of a solid oxide fuel cell.

FIG. 1 is an exploded perspective view illustrating main components constituting a solid oxide fuel cell in the related art. Referring to FIG. 1, a solid oxide fuel cell in the related art includes: a unit cell formed by sequentially stacking a cathode, electrolyte, and an anode; a separator plate disposed on the cathode; and a separator plate disposed on the anode.

Channels are formed in both surfaces of the separator plates. Although not shown in FIG. 1, a cathode collector is disposed between the cathode and the separator plate disposed on the cathode, and an anode collector is disposed between the anode and the separator plate disposed on the anode.

Air flows through channels between the cathode and the separator plate, and fuel gas flows through channels between the anode and the separator plate. Flows of reaction gas (the air and the fuel gas) induce oxygen or hydrogen ion conduction in an electrolyte layer, and an electrochemical reaction is generated on electrodes (the cathode and the anode), thereby generating electromotive force.

The air or the fuel gas is introduced into a side of the channels and is discharged from another side thereof. In other words, a fuel cell has inflow holes through which reaction gas is introduced, and outflow holes through which the reaction gas is discharged.

It is ideal that an electrochemical reaction uniformly occurs over an area across which reaction gas passes through a fuel cell. However in practice, reaction gas collects adjacent inflow holes, and a concentration of reaction gas near outflow holes is low. Thus, electricity is not uniformly generated over the entire area of a collector, and a large amount of electricity is generated in a portion of the collector near the inflow holes, and a small amount of electricity is generated in a portion of the collector near the outflow holes.

This decreases a current collecting efficiency of a fuel cell. In addition, since a reaction occurs more intensively at the inflow holes, the inflow holes are deteriorated more significantly than the outflow holes are.

Thus, although the outflow holes are slightly deteriorated, the significant deterioration of the inflow holes may significantly reduce the service life of the fuel cell.

SUMMARY

Accordingly, the present invention aims at providing a solid oxide fuel cell configured such that an electrochemical reaction uniformly occurs over an area across which reaction gas passes through the solid oxide fuel cell.

Also, the present invention aims at providing a solid oxide fuel cell having a structure such that reaction gas inflow holes and reaction gas outflow holes are uniformly deteriorated.

Also, the present invention aims at providing a solid oxide fuel cell having an extended service life.

According to an aspect of the present invention, there is provided a solid oxide fuel cell including: a unit cell formed by stacking a cathode, electrolyte, and an anode; a separator plate having channels in both surfaces thereof, wherein reaction gas flows through the channels, and the channels include longitudinal channels parallel to a flow direction of the reaction gas, and lateral channels crossing the flow direction of the reaction gas; and a collector disposed between the unit cell and the separator plate, wherein the longitudinal channels increase in width from a reaction gas inflow hole to a reaction gas outflow hole.

Both the surfaces of the separator plate may be provided with protrusion parts separated by the longitudinal channels and the lateral channels and having a trapezoidal shape.

Both the surfaces of the separator plate may be provided with protrusion parts separated by the longitudinal channels and the lateral channels and having a hexagonal shape.

The lateral channels may increase in width from the reaction gas inflow hole to the reaction gas outflow hole.

A width of the longitudinal channels adjacent to an end part of the reaction gas outflow hole may be 1.5 to 3 times greater than a width of the longitudinal channels adjacent to an end part of the reaction gas inflow hole.

Both the surfaces of the separator plate may be provided with protrusion parts separated by the longitudinal channels and the lateral channels, and the collector may cover the longitudinal channels, the lateral channels, and the protrusion parts.

Any one of the longitudinal channels formed in a surface of the separator plate may be disposed between neighboring ones of the longitudinal channels formed in another surface of the separator plate.

The solid oxide fuel cell may further include an end plate, wherein a channel parallel to the flow direction of the reaction gas, and a lateral channel crossing the flow direction of the reaction gas are formed in only one surface of the end plate.

BRIEF DESCRIPTION OF THE DRAWINGS

The accompanying drawings illustrate preferred embodiments of the present invention and, together with the description, provide a further understanding of the technical spirit of the present invention. Thus, the present invention is not limited to the features illustrated in the drawings, in which.

DETAILED DESCRIPTION

Figure 1:
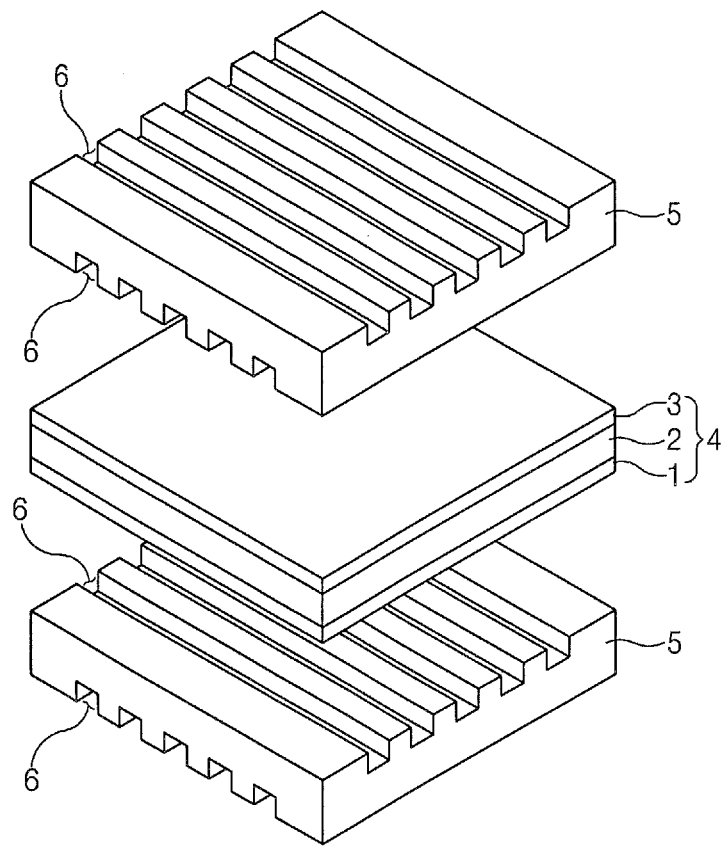
FIG. 1 is an exploded perspective view illustrating main components constituting a solid oxide fuel cell in the related art.

Hereinafter, a solid oxide fuel cell having longitudinal and lateral channels according to preferred embodiments of the present invention will be described in detail with reference to the accompanying drawings.

Terms used in the following description and scopes of claims are not limited to terms that have been in dictionaries, and are used only for explaining specific exemplary embodiments while not limiting the present invention. Therefore, the embodiments and drawings proposed herein are just preferable examples for the purpose of illustrations only, not intended to limit the technical spirit of the invention, so it should be understood that other equivalents and modifications could be made thereto without departing from the spirit and scope of the invention.

In the drawings, the size of each element or a specific part that constitutes the element is exaggerated, omitted, or schematically illustrated for convenience in description and clarity. Thus, the size of each element does not entirely reflect the actual size thereof. Moreover, detailed descriptions related to well-known functions or configurations will be ruled out in order not to unnecessarily obscure subject matters of the present invention.

Figure 2:
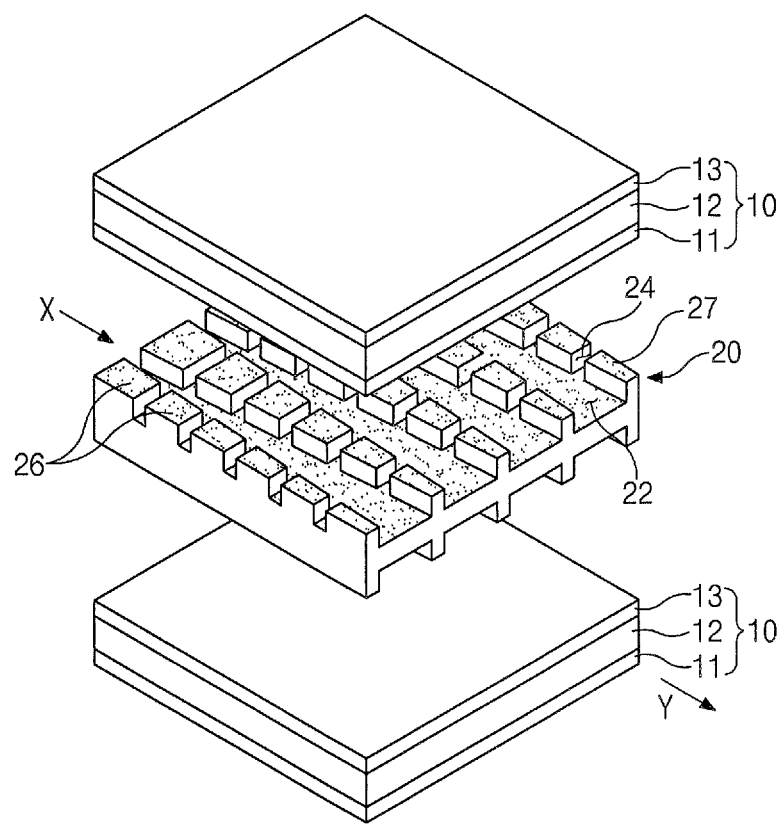
FIG. 2 is an exploded perspective view illustrating a part of a solid oxide fuel cell according to a preferred embodiment of the present invention.
Figure 3:
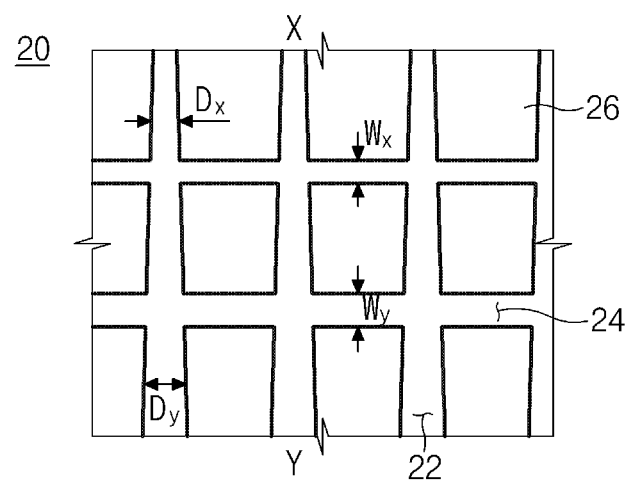
FIG. 3 is a plan view illustrating a separator plate used in the solid oxide fuel cell according to the embodiment of FIG. 2.

FIG. 2 is an exploded perspective view illustrating a part of a solid oxide fuel cell according to a preferred embodiment of the present invention. FIG. 3 is a plan view illustrating a separator plate used in the solid oxide fuel cell according to the current embodiment.

Referring to FIGS. 2 and 3, a solid oxide fuel cell (hereinafter, referred to as "a fuel cell") will now be described according to the current embodiment.

A fuel cell 100 according to the current embodiment includes unit cells 10, a separator plate 20, and collectors.

The unit cell 10 is formed by stacking a cathode 13, electrolyte 12, and an anode 11.

A material for the cathode 13 (an air electrode) may be a perovskite-based compound such as $LaSrMnO_3$ (LSM) or $LaSrCoFeO_3$ (LSCF). A material for the electrolyte 12 may be powder including one or more of materials based on zirconia (a rare-earth element such as YSZ or $Sc_2O_3+ZrO_2$ (ScSZ)), ceria ($CeO_2$), a bismuth oxide ($Bi_2O_3$), and perovskite. A material for the anode 11 (a fuel electrode) may be a mixture of a cermet, yttria-stabilized zirconia ($ZrO_2+8Y_2O_3$, YSZ), and a metal such as Ni. The unit cell 10 has at least three layers of the cathode 13, the electrolyte 12, and the anode 11.

Channels through which reaction gas flows are formed in both surfaces of the separator plate 20. The reaction gas is fuel gas and air, and the fuel gas may be pure hydrogen, pure methane, pure propane, pure butane, modified hydrogen, modified methane, modified propane, or modified butane. The air may be not only typical air, but also gas mixed with oxygen.

Referring to FIG. 2, the reaction gas is introduced into the fuel cell 100 in a direction X and is discharged from the fuel cell 100 in a direction Y. Thus, a side of the fuel cell 100 into which the reaction gas is introduced in the direction X is referred to as an inflow part, and a side of the fuel cell 100 from which the reaction gas is discharged in the direction Y is referred to as an outflow part.

The channels include longitudinal channels 22 parallel to a flow direction of the reaction gas, and lateral channels 24 crossing the flow direction of the reaction gas. Thus, protrusion parts 26 separated by the longitudinal and lateral channels 22 and 24 are formed in outer surfaces of the separator plate 20. The widths of the longitudinal and lateral channels 22 and 24 illustrated in FIG. 2 are exaggerated for convenience in description and may be thus decreased, and the number of the longitudinal and lateral channels 22 and 24 may be increased.

The longitudinal channels 22 formed in the upper surface of the separator plate 20 are disposed in locations corresponding to those of the longitudinal channels 22 formed in the lower surface of the separator plate 20. That is, the longitudinal channels 22 or the protrusion parts 26 are formed in both the upper and lower surfaces of the separator plate 20 in a thickness direction of the separator plate 20.

However, the separator plate 20 is not limited to such a top and bottom symmetrical figure. For example, any one of the longitudinal channels 22 formed in a surface of the separator plate 20 may be disposed between neighboring ones of the longitudinal channels 22 formed in another surface of the separator plate 20. That is, in the case that the separator plate 20 has a top and bottom asymmetrical figure, when longitudinal channels 22 are formed in a section on the upper surface of the separator plate 20 in the thickness direction of the separator plate 20, protrusion parts 26 may be formed in the section on the lower surface of the separator plate 20. On the contrary, when protrusion parts 26 are formed in a section on the upper surface of the separator plate 20 in the thickness direction of the separator plate 20, longitudinal channels 22 may be formed in the section on the lower surface of the separator plate 20. In other words, the longitudinal channels 22 formed in the upper surface of the separator plate 20 may be alternately disposed with the longitudinal channels 22 formed in the lower surface of the separator plate 20.

Although the longitudinal channels 22 formed in the upper and lower surfaces of the separator plate 20 are disposed in the same direction, and the lateral channels 22 formed in the upper and lower surfaces of the separator plate 20 are disposed in the same direction, as illustrated in FIG. 2, the present invention is not limited to this arrangement. For example, the longitudinal channels 22 formed in the upper surface of the separator plate 20 may cross the longitudinal channels 22 formed in the lower surface of the separator plate 20, and the lateral channels 24 formed in the upper surface of the separator plate 20 may cross the lateral channels 24 formed in the lower surface of the separator plate 20.

The separator plate 20 will be described in more detail later.

Collectors 27 are disposed between the unit cell 10 and the separator plate 20. The collectors 27 are applied to the upper and lower surfaces of the separator plate 20. Since the upper and lower surfaces of the separator plate 20 are constituted by the longitudinal channels 22, the lateral channels 24, and the protrusion parts 26 taking the regions of the upper and lower surfaces of the separator plate 20 except for the regions taken by the longitudinal channels 22 and the lateral channels 24, the collector may cover the longitudinal channels 22, the lateral channels 24, and the protrusion parts 26.

For example, the collector may be formed of an electronically conductive perovskite-based compound.

FIG. 3 is a plan view illustrating the separator plate 20 used in the solid oxide fuel cell according to the current embodiment.

The separator plate 20 will now be described in more detail with reference to FIG. 3.

Referring to FIG. 3, the width of the longitudinal channels 22 increases from reaction gas inflow holes to reaction gas outflow holes. That is, a width $D_Y$ of a section of the longitudinal channels 22, which is close to the reaction gas outflow holes, is greater than a width $D_X$ of a section of the longitudinal channels 22 which is close to the reaction gas inflow holes. Thus, the protrusion parts 26 have a trapezoidal shape.

Figure 4:
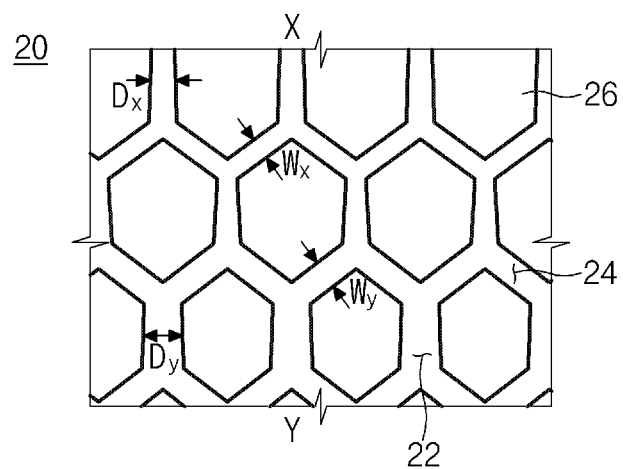
FIG. 4 is a plan view illustrating a modification of the separator plate used in the solid oxide fuel cell according to the embodiment of FIG. 2.

However, the shape of the protrusion parts 26 is not limited to the trapezoidal shape. FIG. 4 is a plan view illustrating a modification of the separator plate 20 used in the fuel cell 100, according to a preferred embodiment of the present invention. Referring to FIG. 4, protrusion parts 26 may have a hexagonal shape. That is, the protrusion parts 26 according to the current embodiment may have a honeycomb-like shape.

Also in the current embodiment, a width $D_Y$ of a section of longitudinal channels 22, which is close to reaction gas outflow holes, is greater than a width $D_X$ of a section of the longitudinal channels 22 which is close to reaction gas inflow holes.

The width of lateral channels 24 may also increase from the reaction gas inflow holes to the reaction gas outflow holes. That is, a width $W_Y$ of a section of the lateral channels 24, which is close to the reaction gas outflow holes, may be greater than a width $W_X$ of a section of the lateral channels 24 which is close to the reaction gas inflow holes.

As such, the width of the longitudinal channels 22 increases toward the reaction gas outflow holes, or the width of the lateral channels 24 increases toward the reaction gas outflow holes, thereby significantly mitigating issues in the related art in which: reaction gas is collected to reaction gas inflow holes; and a concentration of reaction gas near reaction gas outflow holes is lowered. The reaction gas tends to spread from a small space to a large space, and the widths of the longitudinal and lateral channels 22 and 24 increase toward the reaction gas outflow holes. Thus, the reaction gas uniformly spreads in a region from the reaction gas inflow holes to the reaction gas outflow holes. Accordingly, an electrochemical reaction uniformly occurs over an area across which the reaction gas passes through the fuel cell 100.

A portion of the collector applied to the longitudinal and lateral channels 22 and 24 does not contact the cathode 13 or the anode 11, and only a portion of the collector applied to the protrusion parts 26 contacts the cathode 13 or the anode 11. A current collecting efficiency of the collector is improved as an area of the collector contacting the cathode 13 or the anode 11 increases. As a result, as a region taken by the protrusion parts 26 increases, the current collecting efficiency is improved.

That is, an increase in an outflow width of the longitudinal and lateral channels 22 and 24 improves uniform spread of the reaction gas, but decreases the areas of the protrusion parts 26. Thus, appropriate adjustment of such a trade-off is needed.

The inventor of the present invention has discovered through an experiment that when a width of the longitudinal channels 22 adjacent to an end part of the reaction gas outflow holes is 1.5 to 3 times greater than a width of the longitudinal channels 22 adjacent to an end part of the reaction gas inflow holes, the reaction gas uniformly spreads over the entire area of the fuel cell 100, and the protrusion parts 26 have sufficiently large areas. Under this condition, the current collecting efficiency is highest.

In addition, since the reaction gas uniformly spreads over the entire area of the fuel cell 100, the reaction gas inflow holes and the reaction gas outflow holes are uniformly deteriorated. Thus, the reaction gas inflow holes are prevented from being deteriorated first, which improves the service life of the fuel cell 100.

Figure 5:
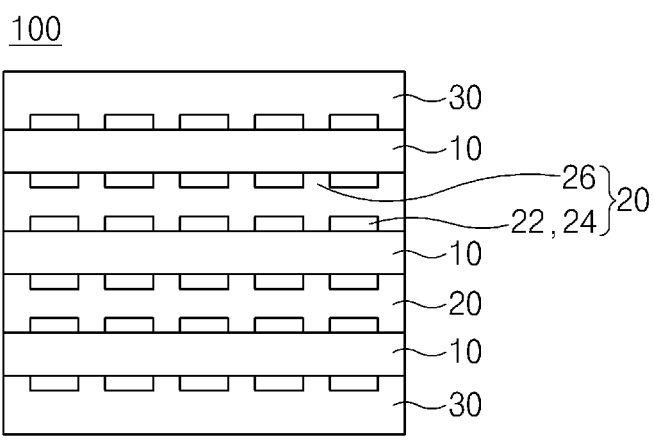
FIG. 5 is a vertical cross-sectional view illustrating a solid oxide fuel cell according to another preferred embodiment of the present invention.

FIG. 5 is a vertical cross-sectional view illustrating a fuel cell according to a preferred embodiment of the present invention.

Longitudinal channels 22 and lateral channels 24 may not be exposed to outsides of a completed fuel cell 100. Thus, end plates 30 may be disposed on the uppermost surface and the lowermost surface of the fuel cell 100. Accordingly, longitudinal channels 22 or lateral channels 24 are formed in only one surface of the end plates 30.

The fuel cell 100 may have a structure formed by sequentially stacking an end plate 30, a unit cell 10, a separator plate 20, a unit cell 10, a separator plate 20, a unit cell 10, and an end plate 30. Additional unit cells 10 and additional separator plates 20 may be provided to the fuel cell 100 to increase the capacity thereof, and the number of the additional unit cells 10 may be equal to the number of the additional separator plates 20.

Although not shown in FIG. 5, collectors are disposed between the end plates 30 and the unit cells 10 and between the separator plates 20 and the unit cells 10.

According to the present invention, provided is a solid oxide fuel cell configured such that an electrochemical reaction uniformly occurs over an area across which reaction gas passes through the solid oxide fuel cell.

Also, provided is a solid oxide fuel cell having a structure such that reaction gas inflow holes and reaction gas outflow holes are uniformly deteriorated.

Also, provided is a solid oxide fuel cell having an extended service life.

While the present invention has been particularly shown and described with reference to exemplary embodiments and drawings thereof, it will be understood by those of ordinary skill in the art that various modifications and changes in form and details may be made therein without departing from the spirit and scope of the present invention as defined by the following claims.

The invention claimed is:

1. A solid oxide fuel cell comprising:
a unit cell formed by stacking a cathode, electrolyte, and an anode;
a separator plate having channels in both surfaces thereof, wherein reaction gas flows through the channels, and the channels include longitudinal channels parallel to a flow direction of the reaction gas, and lateral channels crossing the flow direction of the reaction gas; and
a plurality of collectors disposed between the unit cell and the separator plate,
wherein the longitudinal channels gradually increase in width from reaction gas inflow holes to reaction gas outflow holes in all sections of the longitudinal channels between the reaction gas inflow holes and the reaction gas outflow holes, and the lateral channels gradually increase in width from the reaction gas inflow holes to the reaction gas outflow holes in all sections of the lateral channels between the reaction gas inflow holes and the reaction gas outflow holes,
wherein the longitudinal channels include longitudinal units, each longitudinal unit being disposed between either: two adjacent ones of the lateral channels, a respective one of the reaction gas inflow holes and one of the lateral channels that is adjacent thereto, or a respective one of the reaction gas outflow holes and one of the lateral channels that is adjacent thereto, and
wherein a width of each of the longitudinal units in a direction crossing the flow direction of the reaction gas gradually increases along the flow direction of the reaction gas so that a cross-section of each of the longitudinal units in a plane parallel to the unit cell has a tapered trapezoidal shape.

2. The solid oxide fuel cell of claim 1, wherein both the surfaces of the separator plate are provided with protrusion parts separated by the longitudinal channels and the lateral channels and having a trapezoidal shape.

3. The solid oxide fuel cell of claim 1, wherein both the surfaces of the separator plate are provided with protrusion parts separated by the longitudinal channels and the lateral channels and having a hexagonal shape.

4. The solid oxide fuel cell of claim 1, wherein a width of the longitudinal channels adjacent to an end part of the reaction gas outflow holes is 1.5 to 3 times greater than a width of the longitudinal channels adjacent to an end part of the reaction gas inflow holes.

5. The solid oxide fuel cell of claim 1, wherein both the surfaces of the separator plate are provided with protrusion parts separated by the longitudinal channels and the lateral channels, and the plurality of collectors cover the longitudinal channels, the lateral channels, and the protrusion parts.

6. The solid oxide fuel cell of claim 1, wherein any one of the longitudinal channels formed in a surface of the separator plate is disposed between neighboring ones of the longitudinal channels formed in another surface of the separator plate.

7. The solid oxide fuel cell of claim 1, further comprising an end plate, wherein a channel parallel to the flow direction of the reaction gas, and a lateral channel crossing the flow direction of the reaction gas are formed in only one surface of the end plate.

* * * * *